(12) United States Patent
Speldrich

(10) Patent No.: US 8,756,990 B2
(45) Date of Patent: Jun. 24, 2014

(54) MOLDED FLOW RESTRICTOR

(75) Inventor: Jamie Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 451 days.

(21) Appl. No.: 13/074,932

(22) Filed: Mar. 29, 2011

(65) Prior Publication Data

US 2011/0247411 A1    Oct. 13, 2011

Related U.S. Application Data

(60) Provisional application No. 61/322,754, filed on Apr. 9, 2010.

(51) Int. Cl.
*G01F 15/14* (2006.01)

(52) U.S. Cl.
USPC .......................................... 73/273; 73/861.52

(58) Field of Classification Search
USPC .................. 73/273, 204.21, 862.582; 264/276
See application file for complete search history.

(56) References Cited

U.S. PATENT DOCUMENTS

| | | | |
|---|---|---|---|
| 2,746,296 A | 5/1956 | Stover | |
| 3,216,249 A | 11/1965 | Joel | |
| 3,410,287 A | 11/1968 | Van Der Heyden et al. | |
| 3,433,069 A | 3/1969 | Trageser | |
| 3,559,482 A | 2/1971 | Baker et al. | |
| 3,640,277 A | 2/1972 | Adelberg | |
| 3,785,206 A | 1/1974 | Benson et al. | |
| 3,830,104 A | 8/1974 | Gau | |
| 3,838,598 A | 10/1974 | Tompkins | |
| 3,895,531 A | 7/1975 | Lambert | |
| 3,952,577 A | 4/1976 | Hayes et al. | |
| 3,981,074 A | 9/1976 | Yamamoto et al. | |
| 4,030,357 A | 6/1977 | Wemyss | |
| 4,041,757 A | 8/1977 | Baker et al. | |

(Continued)

FOREIGN PATENT DOCUMENTS

| | | |
|---|---|---|
| DE | 3905746 | 8/1990 |
| DE | 102004019521 | 11/2005 |

(Continued)

OTHER PUBLICATIONS

Bodycote, "Honeywell Sensing and Control, Sensiron SDP610 Competitive Teardown Analysis," 15 pages, Feb. 19, 2009.

(Continued)

*Primary Examiner* — Lisa Caputo
*Assistant Examiner* — Roger Hernandez-Prewit
(74) *Attorney, Agent, or Firm* — Seager, Tufte, Wickhem LLC

(57) ABSTRACT

The present disclosure relates generally to flow sensors, and more particularly, to devices and methods for providing a pressure drop through a flow sensor at a given flow rate. In one illustrative embodiment, a sensor assembly includes a housing with a first flow port and a second flow port. The housing may define a fluid channel extending between the first flow port and the second flow port, with a sensor positioned in the housing and exposed to the fluid channel. The illustrative sensor may be configured to sense a measure related to the flow rate of a fluid flowing through the fluid channel. A flow restrictor may be situated in and integrally molded with at least one of the first flow port and the second flow port. The flow restrictor may be configured to accurately provide a pressure drop through the flow sensor at a given flow rate.

18 Claims, 10 Drawing Sheets

(56) References Cited

U.S. PATENT DOCUMENTS

| | | | |
|---|---|---|---|
| 4,100,801 | A | 7/1978 | LeMay |
| 4,326,214 | A | 4/1982 | Trueblood |
| 4,343,194 | A | 8/1982 | Dehart et al. |
| 4,411,292 | A | 10/1983 | Schiller |
| 4,418,723 | A | 12/1983 | Koni et al. |
| 4,444,060 | A | 4/1984 | Yamamoto |
| RE31,570 | E | 5/1984 | Drexel |
| 4,478,076 | A | 10/1984 | Bohrer |
| 4,478,077 | A | 10/1984 | Bohrer et al. |
| 4,481,828 | A | 11/1984 | Cheng |
| 4,494,405 | A | 1/1985 | Oosuga et al. |
| 4,501,144 | A | 2/1985 | Higashi et al. |
| 4,546,655 | A | 10/1985 | Victor |
| 4,581,945 | A | 4/1986 | Rusz |
| 4,648,270 | A | 3/1987 | Johnson et al. |
| 4,653,321 | A | 3/1987 | Cunningham et al. |
| 4,655,088 | A | 4/1987 | Adams |
| 4,668,102 | A | 5/1987 | Mott |
| 4,672,997 | A | 6/1987 | Landis et al. |
| 4,677,858 | A | 7/1987 | Ohnhaus |
| 4,696,194 | A | 9/1987 | Taylor |
| 4,768,386 | A | 9/1988 | Taddeo |
| 4,790,181 | A | 12/1988 | Aine |
| 4,800,754 | A | 1/1989 | Korpi |
| 4,825,704 | A | 5/1989 | Aoshima et al. |
| 4,829,818 | A | 5/1989 | Bohrer |
| 4,839,038 | A | 6/1989 | Mclain, II |
| 4,856,328 | A | 8/1989 | Johnson |
| 4,900,242 | A | 2/1990 | Maus et al. |
| 4,961,344 | A | 10/1990 | Rodder |
| 4,976,283 | A | 12/1990 | Wildfang et al. |
| 5,000,478 | A | 3/1991 | Kerastas |
| 5,014,552 | A * | 5/1991 | Kamiunten et al. ........ 73/204.21 |
| 5,050,429 | A | 9/1991 | Nishimoto et al. |
| 5,063,786 | A | 11/1991 | Sanderson et al. |
| 5,063,787 | A | 11/1991 | Khuzai et al. |
| 5,081,866 | A | 1/1992 | Ochiai et al. |
| 5,088,332 | A | 2/1992 | Merilainen et al. |
| 5,107,441 | A | 4/1992 | Decker |
| 5,161,410 | A | 11/1992 | Davey et al. |
| 5,220,830 | A | 6/1993 | Bonne |
| 5,231,877 | A | 8/1993 | Henderson |
| 5,249,462 | A | 10/1993 | Bonne |
| 5,253,517 | A | 10/1993 | Molin et al. |
| 5,295,394 | A | 3/1994 | Suzuki |
| 5,303,584 | A | 4/1994 | Ogasawara et al. |
| 5,319,973 | A | 6/1994 | Crayton et al. |
| 5,332,005 | A | 7/1994 | Baan |
| 5,341,841 | A | 8/1994 | Schaefer |
| 5,341,848 | A | 8/1994 | Laws |
| 5,357,793 | A | 10/1994 | Jouwsma |
| 5,379,650 | A | 1/1995 | Kofoed et al. |
| 5,385,046 | A | 1/1995 | Yamakawa et al. |
| 5,400,973 | A | 3/1995 | Cohen |
| 5,404,753 | A | 4/1995 | Hecht et al. |
| 5,463,899 | A * | 11/1995 | Zemel et al. .................... 73/195 |
| 5,481,925 | A | 1/1996 | Woodbury |
| 5,535,633 | A | 7/1996 | Kofoed et al. |
| 5,537,870 | A | 7/1996 | Zurek et al. |
| 5,581,027 | A | 12/1996 | Juntunen |
| 5,609,303 | A | 3/1997 | Cohen |
| 5,634,592 | A | 6/1997 | Campau |
| 5,717,145 | A | 2/1998 | Yasuhara et al. |
| 5,735,267 | A | 4/1998 | Tobia |
| 5,736,651 | A | 4/1998 | Bowers |
| 5,741,968 | A | 4/1998 | Arai |
| 5,750,892 | A | 5/1998 | Huang et al. |
| 5,763,787 | A | 6/1998 | Gravel et al. |
| 5,781,291 | A | 7/1998 | So et al. |
| 5,789,660 | A | 8/1998 | Kofoed et al. |
| 5,792,958 | A | 8/1998 | Speldrich |
| 5,817,950 | A | 10/1998 | Wiklund et al. |
| 5,829,685 | A | 11/1998 | Cohen |
| 5,844,135 | A | 12/1998 | Brammer et al. |
| 5,861,561 | A | 1/1999 | Van Cleve et al. |
| 5,866,824 | A | 2/1999 | Schieber |
| 5,942,694 | A | 8/1999 | Robins et al. |
| 6,044,716 | A | 4/2000 | Yamamoto |
| 6,119,730 | A | 9/2000 | McMillan |
| 6,128,963 | A | 10/2000 | Bromster |
| 6,142,014 | A | 11/2000 | Rilling |
| 6,164,143 | A | 12/2000 | Evans |
| 6,247,495 | B1 | 6/2001 | Yamamoto et al. |
| 6,308,553 | B1 | 10/2001 | Bonne et al. |
| 6,312,389 | B1 | 11/2001 | Kofoed et al. |
| 6,322,247 | B1 | 11/2001 | Bonne et al. |
| 6,526,822 | B1 | 3/2003 | Maeda et al. |
| 6,527,385 | B2 | 3/2003 | Koitabashi et al. |
| 6,543,449 | B1 | 4/2003 | Woodring et al. |
| 6,553,808 | B2 | 4/2003 | Bonne et al. |
| 6,561,021 | B2 | 5/2003 | Uramachi et al. |
| 6,579,087 | B1 | 6/2003 | Vrolijk |
| 6,591,674 | B2 | 7/2003 | Gehman et al. |
| 6,655,207 | B1 | 12/2003 | Speldrich et al. |
| 6,681,623 | B2 | 1/2004 | Bonne et al. |
| 6,715,339 | B2 | 4/2004 | Bonne et al. |
| 6,742,399 | B2 | 6/2004 | Kunz et al. |
| 6,761,165 | B2 | 7/2004 | Strickland, Jr. |
| 6,769,299 | B2 | 8/2004 | Forster et al. |
| 6,779,393 | B1 | 8/2004 | Muller et al. |
| 6,779,395 | B2 | 8/2004 | Hornung et al. |
| 6,820,480 | B2 * | 11/2004 | De'Stefani et al. ........ 73/204.18 |
| 6,826,966 | B1 | 12/2004 | Karbassi et al. |
| 6,871,534 | B1 | 3/2005 | Hamada et al. |
| 6,871,535 | B2 * | 3/2005 | Blakley et al. ............. 73/204.22 |
| 6,871,537 | B1 | 3/2005 | Gehman et al. |
| 6,886,401 | B2 | 5/2005 | Ito et al. |
| 6,901,795 | B2 | 6/2005 | Naguib et al. |
| 6,904,799 | B2 | 6/2005 | Cohen et al. |
| 6,904,907 | B2 | 6/2005 | Speldrich et al. |
| 6,907,787 | B2 | 6/2005 | Cook et al. |
| 6,915,682 | B2 | 7/2005 | Renninger et al. |
| 6,928,865 | B2 | 8/2005 | Ito et al. |
| 6,957,586 | B2 | 10/2005 | Sprague |
| 7,000,298 | B2 | 2/2006 | Cook et al. |
| 7,000,612 | B2 | 2/2006 | Jafari et al. |
| 7,028,560 | B2 | 4/2006 | Castillon Levano |
| 7,032,463 | B2 | 4/2006 | Misholi et al. |
| 7,036,366 | B2 | 5/2006 | Emmert et al. |
| 7,043,978 | B2 | 5/2006 | Goka et al. |
| 7,059,184 | B2 | 6/2006 | Kanouda et al. |
| 7,100,454 | B2 | 9/2006 | Hasunuma |
| 7,107,834 | B2 | 9/2006 | Meneghinin et al. |
| 7,121,139 | B2 | 10/2006 | Shajii et al. |
| 7,243,541 | B1 | 7/2007 | Bey et al. |
| 7,258,003 | B2 | 8/2007 | Padmanabhan et al. |
| 7,278,309 | B2 | 10/2007 | Dmytriw et al. |
| 7,278,326 | B2 | 10/2007 | Kobayashi et al. |
| 7,337,677 | B2 | 3/2008 | Mizohata |
| 7,343,823 | B2 | 3/2008 | Speldrich |
| 7,347,785 | B2 | 3/2008 | Worman, Jr. et al. |
| 7,353,719 | B2 | 4/2008 | Hiura et al. |
| 7,373,819 | B2 | 5/2008 | Engler et al. |
| 7,386,166 | B2 | 6/2008 | Curry et al. |
| 7,430,918 | B2 | 10/2008 | Selvan et al. |
| 7,454,984 | B1 | 11/2008 | Ross et al. |
| 7,464,611 | B2 | 12/2008 | Matter et al. |
| 7,472,580 | B2 | 1/2009 | Lyons et al. |
| 7,479,255 | B2 | 1/2009 | Otani et al. |
| 7,513,149 | B1 | 4/2009 | Ricks |
| 7,516,761 | B2 | 4/2009 | Setescak |
| 7,520,051 | B2 | 4/2009 | Becke et al. |
| 7,549,332 | B2 | 6/2009 | Yamashita et al. |
| 7,568,383 | B2 | 8/2009 | Colvin et al. |
| 7,603,898 | B2 | 10/2009 | Speldrich |
| 7,631,562 | B1 | 12/2009 | Speldrich |
| 7,647,835 | B2 | 1/2010 | Speldrich |
| 7,654,157 | B2 | 2/2010 | Speldrich |
| 7,661,303 | B2 | 2/2010 | Kohno et al. |
| 7,685,874 | B2 * | 3/2010 | Nakano et al. ............. 73/204.21 |
| 7,698,938 | B2 | 4/2010 | Inagaki et al. |
| 7,698,958 | B2 | 4/2010 | Matter et al. |
| 7,704,774 | B2 | 4/2010 | Mayer et al. |
| 7,730,793 | B2 | 6/2010 | Speldrich |

(56) References Cited

U.S. PATENT DOCUMENTS

| | | | |
|---|---|---|---|
| 7,757,553 B2 | 7/2010 | Meier et al. | |
| 7,793,410 B2 | 9/2010 | Padmanabhan et al. | |
| 7,805,986 B2 | 10/2010 | Colvin et al. | |
| 7,832,269 B2 | 11/2010 | Bey, Jr. et al. | |
| 7,878,980 B2 | 2/2011 | Ricciardelli | |
| 7,891,238 B2 | 2/2011 | Becke et al. | |
| 7,892,488 B2 | 2/2011 | Speldrich et al. | |
| 8,091,586 B2 * | 1/2012 | Briggs | 138/44 |
| 8,113,046 B2 | 2/2012 | Speldrich et al. | |
| 2002/0078744 A1 | 6/2002 | Gehman et al. | |
| 2003/0062045 A1 | 4/2003 | Woodring et al. | |
| 2004/0118200 A1 | 6/2004 | Hornung et al. | |
| 2004/0163461 A1 | 8/2004 | Ito et al. | |
| 2004/0177703 A1 | 9/2004 | Schumacher et al. | |
| 2005/0016534 A1 | 1/2005 | Ost | |
| 2005/0039809 A1 | 2/2005 | Speldrich | |
| 2005/0235757 A1 | 10/2005 | De Jonge et al. | |
| 2005/0247106 A1 | 11/2005 | Speldrich et al. | |
| 2005/0247107 A1 | 11/2005 | Speldrich et al. | |
| 2006/0017207 A1 | 1/2006 | Bechtold et al. | |
| 2006/0101908 A1 | 5/2006 | Meneghini et al. | |
| 2006/0201247 A1 | 9/2006 | Speldrich et al. | |
| 2006/0225488 A1 | 10/2006 | Speldrich | |
| 2007/0176010 A1 | 8/2007 | Figi et al. | |
| 2007/0295068 A1 | 12/2007 | Kozawa et al. | |
| 2008/0163683 A1 | 7/2008 | Becke et al. | |
| 2008/0202929 A1 | 8/2008 | Chapples et al. | |
| 2009/0265144 A1 | 10/2009 | Speldrich | |
| 2010/0013165 A1 | 1/2010 | Speldrich et al. | |
| 2010/0101332 A1 | 4/2010 | Speldrich | |
| 2010/0154559 A1 | 6/2010 | Speldrich | |
| 2010/0269583 A1 | 10/2010 | Jasnie | |
| 2011/0226052 A1 | 9/2011 | Speldrich et al. | |
| 2011/0226053 A1 | 9/2011 | Sorenson et al. | |
| 2011/0247411 A1 | 10/2011 | Speldrich | |
| 2012/0035866 A1 | 2/2012 | Qasimi et al. | |

FOREIGN PATENT DOCUMENTS

| | | |
|---|---|---|
| EP | 0094497 | 11/1983 |
| EP | 0255056 | 2/1988 |
| EP | 1655123 | 5/2006 |
| EP | 1691175 | 8/2006 |
| EP | 1959242 | 8/2008 |
| EP | 2068129 | 10/2009 |
| EP | 2157411 | 2/2010 |
| EP | 2199758 | 6/2010 |
| EP | 2270441 | 1/2011 |
| FR | 377743 | 3/1907 |
| GB | 2123564 | 2/1984 |
| JP | 49120131 | 11/1974 |
| JP | 58221119 | 12/1983 |
| JP | 3099230 | 4/1991 |
| JP | 4069521 | 3/1992 |
| JP | 7083713 | 3/1995 |
| JP | 10239130 | 9/1998 |
| JP | 10307047 | 11/1998 |
| WO | 9221940 | 12/1992 |
| WO | 9315373 | 8/1993 |
| WO | 9517651 | 6/1995 |
| WO | 0111322 | 2/2001 |
| WO | 0161282 | 8/2001 |
| WO | 0198736 | 12/2001 |
| WO | 2006131531 | 12/2006 |
| WO | 2007095528 | 8/2007 |
| WO | 2007137978 | 12/2007 |
| WO | 2008070603 | 6/2008 |

OTHER PUBLICATIONS

Honeywell, "Housing, Flowtube, Drawing 50005182," 1 page, Sep. 2, 2004.
Honeywell, "Housing, Plastic, Drawing 050.1.156," 1 page, Jul. 8, 1998.
Honeywell, "Housing, Subassembly, Drawing SS-12148," 1 page, Oct. 14, 1998.
Honeywell, "Tubing, Plastic, Drawing SS-12062," 1 page, Apr. 5, 1999.
Honeywell, "Tubing, Plastic, Drawing SS-12160," 1 page, drawn Jan. 28, 1998.
"Schematic Cross-Section for AWM43600," 1 page, prior to Jan. 31, 2011.
Bodycote, "Competitive Teardown Analysis of Sensirion EMI," Bodycote Testing Group, 24 pages, Oct. 15, 2007.
U.S. Appl. No. 13/018,017, filed Jan. 31, 2011.
U.S. Appl. No. 13/018,037, filed Jan. 31, 2011.
Honeywell, "Airflow Sensors Line Guide," 6 pages, Apr. 2010.
Honeywell, "Airflow Sensors Line Guide," 6 pages, Nov. 2010.
Honeywell, "Airflow, Force and Pressure Sensors," Product Range Guide, 20 pages, Mar. 2011.
Honeywell, "Airflow, Force, and Pressure Sensors," Product Range Guide, 20 pages, Apr. 2010.
Honeywell, "AWM43600V, Issue No. 4," 1 page, Jul. 29, 1996.
Honeywell, "AWM43600V, Part No. SS12177," 1 page, Jul. 10, 1998.
Honeywell, "Mass Airflow Sensors, AWM720P1 Airflow," 4 pages, prior to Mar. 22, 2010.
Honeywell, "Mass Airflow Sensors, AWM9000 Airflow," 6 pages, 2003.
Honeywell, "Reference and Application Data, Microbridge Airflow Sensors," 1 page, prior to Mar. 22, 2010.
Honeywell, "Sensing and Control Interactive Catalog," 4 pages, prior to Mar. 22, 2010.
U.S. Appl. No. 13/361,764, filed Jan. 30, 2012.

* cited by examiner

MOLDED FLOW RESTRICTOR

This application claims the benefit of U.S. Provisional Application Ser. No. 61/322,754, filed Apr. 9, 2010, entitled "Molded Flow Restrictor", which is hereby incorporated by reference.

FIELD

The present disclosure relates generally to flow sensors, and more particularly, to devices and methods for providing a precisely controlled pressure drop through a flow sensor at a given flow rate.

BACKGROUND

Flow sensors are often used to sense the flow rate of a fluid (e.g. gas or liquid) traveling through a fluid channel. Such flow sensors are often used in a wide variety of applications including, for example, medical applications, flight control applications, industrial process applications, combustion control applications, weather monitoring applications, as well as many others.

SUMMARY

The present disclosure relates generally to flow sensors, and more particularly, to devices and methods for providing a pressure drop through a flow sensor at a given flow rate. In one illustrative embodiment, a flow sensor assembly includes a housing with a first flow port and a second flow port. The housing may define a fluid channel extending between the first flow port and the second flow port, with a flow sensor positioned in the housing exposed to the fluid channel. The flow sensor may sense a measure related to the flow rate of a fluid flowing through the fluid channel. A flow restrictor may be situated in and integrally molded with at least one of the first flow port and the second flow port. The flow restrictor may be configured to accurately and/or controllably provide a pressure drop through the flow sensor at a given flow rate. In some instances, the flow restrictor may be molded to have flash formed on an upstream and/or downstream surface of the flow restrictor. The flash may be configured and/or oriented such that the flash fails to partially obstruct a designed opening of the flow restrictor.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DESCRIPTION

Figure 1:
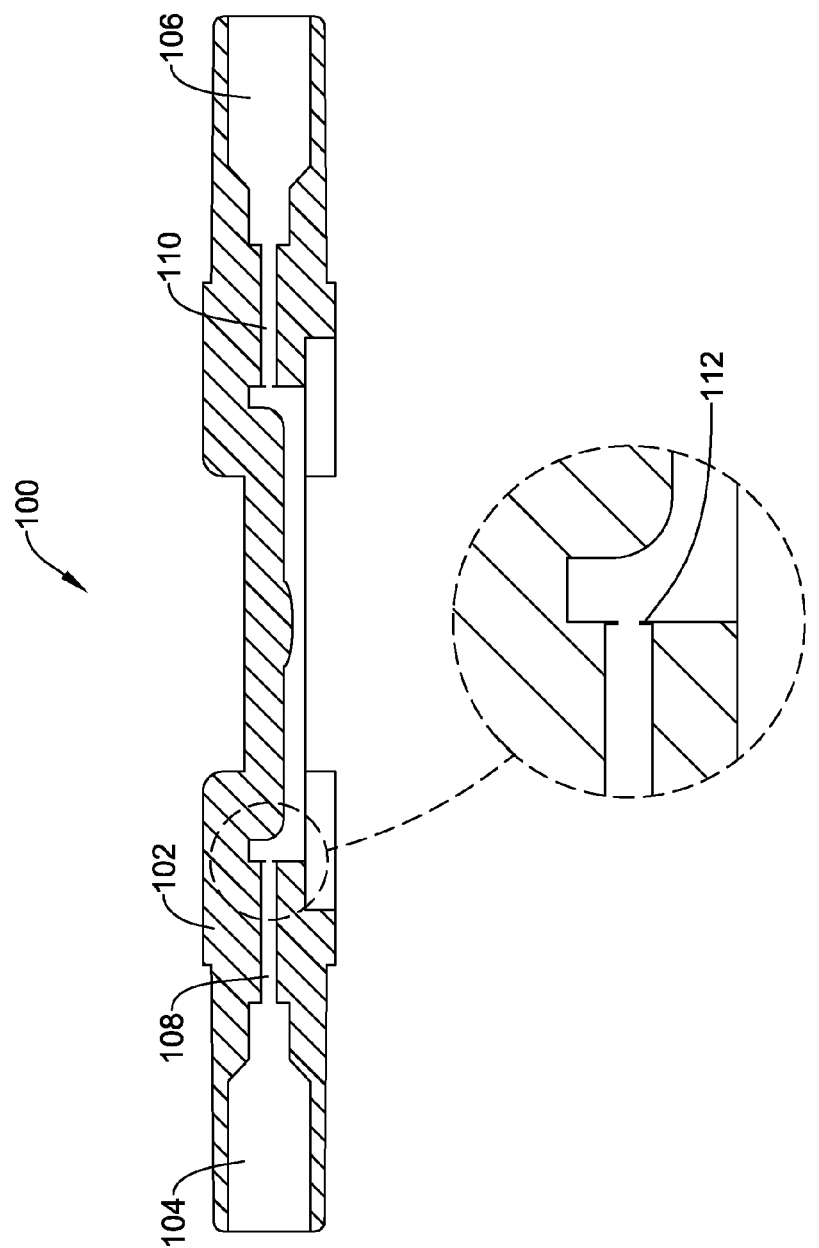
FIG. 1 is a cross-sectional view of an illustrative housing member having flash deposited in a fluid channel.

The following description should be read with reference to the drawings wherein like reference numerals indicate like elements throughout the several views. The description and drawings show several embodiments which are meant to be illustrative of the claimed disclosure.

For merely illustrative purposes, the present disclosure has been described with reference to relative terms including, for example, left, right, top, bottom, front, back, upper, lower, up, and down, as well as others. It is to be understood that these terms are merely used for illustrative purposes and are not meant to be limiting in any manner.

For some applications, it may be desirable to have a particular pressure drop across the flow sensor at a given flow rate of the fluid. In some instances, the pressure drop at a given flow may be based, at least in part, on a diameter of the fluid channel. Variations in the diameter of the fluid channel during manufacturing (e.g. molding) or other processing of the flow sensor may impact the ability of the flow sensor to accurately and precisely achieve a specified pressure drop through the flow sensor at a given flow rate of the fluid.

For example, FIG. 1 shows a cross-sectional view of part of a housing 102 of a flow sensor 100. As shown, the housing 102 includes a flow restrictor 108 in a first flow port 104 of the housing 102 and a flow restrictor 110 in a second flow port 106 of the housing 102. However, in the example shown, flash 112, or excess material, may be deposited in the flow restrictors 108 and 110 during the manufacturing (e.g. molding) of the housing 102. As shown, the flash 112 may extend in a generally perpendicular direction to the flow restrictors 108 and 110 and, in some instances, may create a reduced diameter region that has a diameter less than the diameter of the flow restrictor 108 and 110. The reduced diameter region can impact the pressure drop of the fluid flowing through the housing 102 at a given flow rate. Therefore, there is a need for new and improved systems and method for accurately, reliably, and/or repeatedly providing a pressure drop through a flow sensor at a given flow rate of the fluid.

Figure 2:
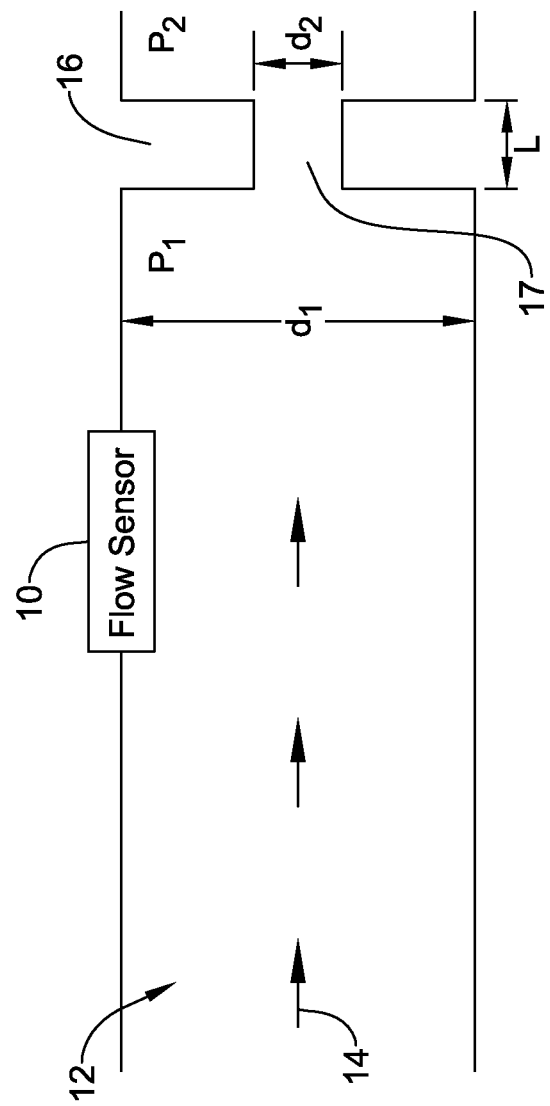
FIG. 2 is a schematic diagram of an illustrative flow sensor for measuring a flow rate of a fluid passing through a fluid channel.
Figure 3:
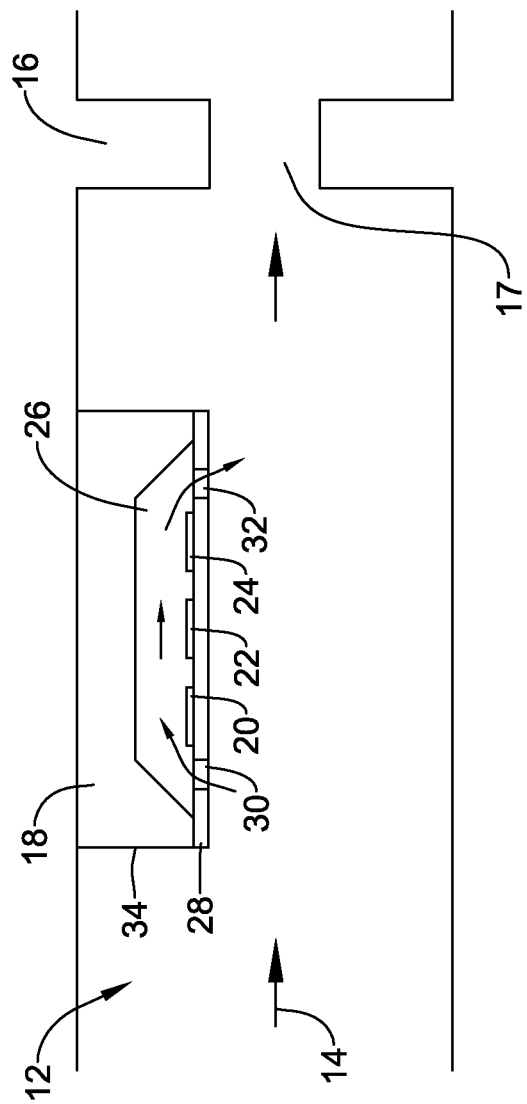
FIG. 3 is a schematic diagram of an illustrative thermal flow sensor assembly useful for measuring the flow rate of a fluid passing through a fluid channel.

FIGS. 2 and 3 are schematic diagrams of illustrative flow sensors 10 and 18 for measuring a flow rate of a fluid flow 14 passing through a fluid channel 12. The term "fluid" as used herein can refer to a gas flow or a liquid flow, depending on the application. As shown in FIG. 2, the flow sensor 10 may be exposed to and/or disposed in the fluid channel 12 to measure one or more properties of the fluid flow 14. For example, the flow sensor 10 may measure the mass flow and/or velocity of the fluid flow 14 using one or more thermal sensors (e.g. see FIG. 3), pressure sensors, acoustical sensors, optical sensors, pitot tubes, and/or any other suitable sensor or sensor combination, as desired. In some cases, the flow sensor 10 may be a microbridge or a Microbrick™ sensor assembly (e.g. see FIG. 3) available from the assignee of the present application, but this is not required. Some illustrative methods and sensor configurations that are considered suitable for measuring the mass flow and/or velocity of the fluid flow 14 are disclosed in, for example, U.S. Pat. Nos. 4,478,076; 4,478,077; 4,501,144; 4,581,928; 4,651,564; 4,683,159; 5,050,429; 6,169,965; 6,223,593; 6,234,016; 6,502,459; 7,278,309; 7,513,149; and 7,647,842. It is contemplated that flow sensor 10 may include any of these flow sensor configurations and methods, as desired. It must be recognized, however, that flow sensor 10 may be any suitable flow sensor, as desired.

In the illustrative example, the fluid channel 12 may experience a range of flow rates of fluid flow 14. For example, the fluid channel 12 may include a high-volume fluid flow, a mid-volume fluid flow, or a low-volume fluid flow. Example fluid flow applications can include, but are not limited to, medical applications (e.g. respirometers, ventilators, spirometers, oxygen concentrators, spectrometry applications, gas chromatography applications, sleep apnea machines, nebulizers, anesthesia delivery machines, etc.), flight control applications, industrial applications (e.g. air-to-fuel ratio, spectrometry, fuel cells, gas leak detection, gas meters, HVAC applications), combustion control applications, weather monitoring applications, as well as any other suitable fluid flow applications, as desired.

Figure 4:
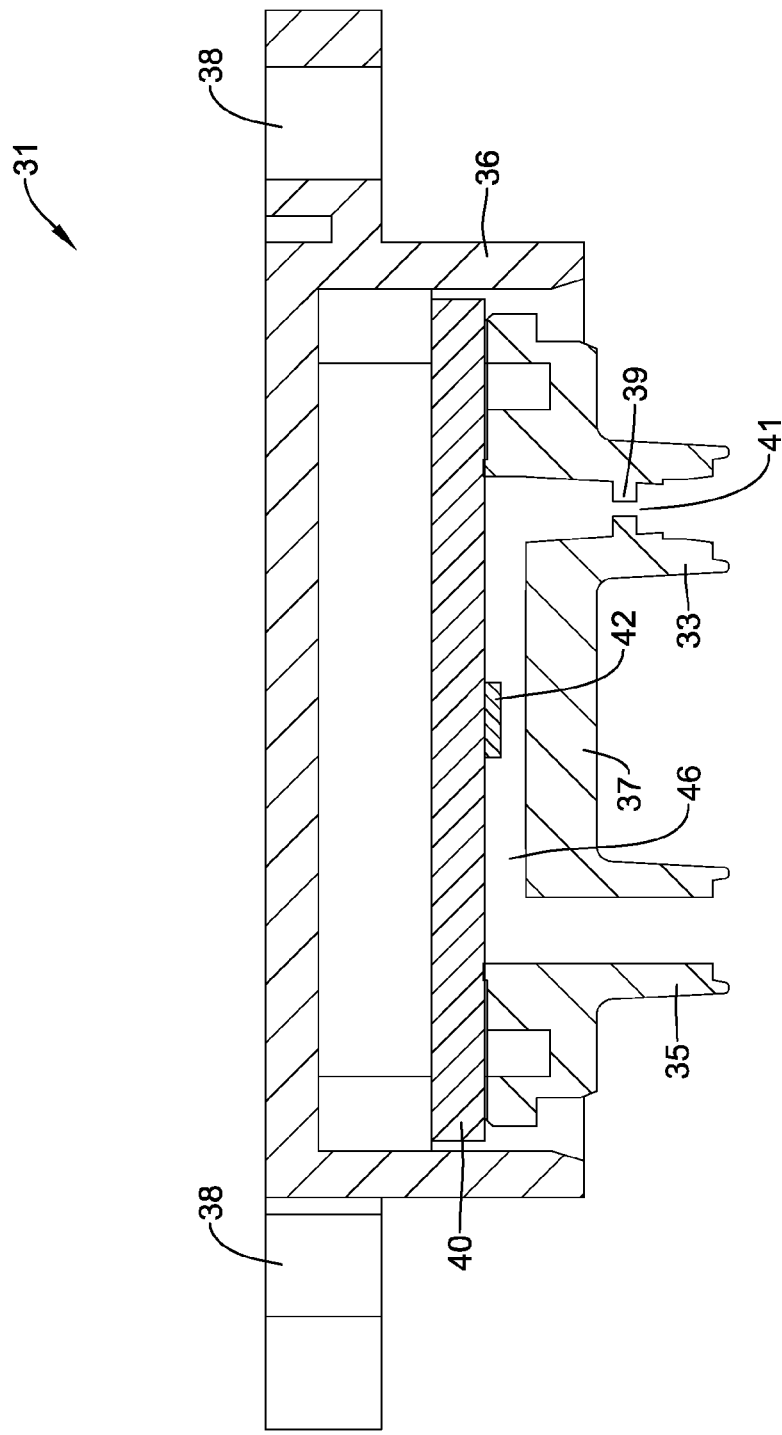
FIG. 4 is a cross-sectional view of an illustrative flow sensor assembly.

As shown in FIG. 3, the flow sensor 18 may be a thermal flow sensor (such as, for example, a microbridge flow sensor, a thermal anemometer sensor, a MEMS-based sensor, etc.) for measuring the flow rate of a fluid flow 14 passing through a fluid channel 12. In the illustrative embodiment, the flow sensor 18 may include a substrate 34 defining a sensor channel 26 for receiving at least some of the fluid flowing through fluid channel 12. In some embodiments, the substrate 34 may be a silicon substrate or other insulating semiconductor substrate, however, any suitable substrate may be used, as desired. A layer 28 may be formed on the substrate and support one or more heater elements, such as heater element 22, and one or more sensor elements, such as sensor elements 20 and 24, for sensing a flow rate of a fluid 14 in the channel 26. As illustrated, layer 28 may be fabricated to include openings 30 and 32 for fluidly connecting the sensor channel 26 to the fluid channel 12. In other implementations, the heater element(s) and sensor elements may be disposed directly on a wall of the fluid channel 12 (or on another substrate that is disposed directly on the wall of the fluid channel 12), without an additional sensor channel 26 (e.g., as is shown in FIG. 4).

As illustrated, the thermal flow sensor 18 may include a heater element 22, a first sensor element 20 positioned upstream of the heater element 22, and a second sensor element 24 positioned downstream of the heater element 22. In this instance, when a fluid flow is present in fluid channel 12, at least some of the fluid 14 may flow through opening 30 into the sensor channel 26, across one or more sensor elements, such as sensor elements 20 and 24, and one or more heater elements, such as heater element 22, and through an opening 32 back into the fluid channel 12.

While the first sensor element 20 is shown as upstream of the heater element 22, and the second sensor element 24 is shown as downstream of the heater element 22, this is not meant to be limiting. It is contemplated that, in some embodiments, the fluid channel 12 and sensor channel 26 may be bi-directional fluid channels such that, in some cases, the first sensor element 20 is downstream of the heater element 22 and the second sensor element 24 is upstream of the heater element 22. In this instance, when a fluid flow is present in fluid channel 12, at least some of the fluid 14 may flow through opening 32 into the sensor channel 26, across one or more sensor elements, such as sensor elements 20 and 24, and one or more heater elements, such as heater element 22, and through opening 30 back into the fluid channel 12. In some embodiment, it is contemplated that only one sensor element may be provided, and in other embodiments, three or more sensor elements may be provided. In some instances, both sensor elements 20 and 24 may be positioned upstream (or downstream) of the heater element 22, if desired.

In some cases, the first sensor element 20 and the second sensor element 24 may be thermally sensitive resistors that have a relatively large positive or negative temperature coefficient, such that the resistance varies with temperature. In some cases, the first and second sensing elements 20 and 24 may be thermistors. In some instances, the first sensor element 20, the second sensor element 24, and any additional sensor elements may be arranged in a Wheatstone bridge configuration, but this is not required in all embodiments.

In the example shown, when no fluid flow is present in the sensor channel 26 and the heater element 22 is heated to a temperature higher than the ambient temperature of the fluid in the fluid flow 14, a temperature distribution may be created in a generally symmetrical distribution about the heater element 22 to upstream sensor element 20 and downstream sensor element 24. In this example, upstream sensor element 20 and downstream sensor element 24 may sense the same or similar temperature (e.g. within 25 percent, 10 percent, 5 percent, 1 percent, 0.001 percent, etc.). In some cases, this may produce the same or similar output voltage in the first sensor element 20 and the second sensor element 24.

When a fluid flow 14 is present in the sensor channel 26 and the heater element 22 is heated to a temperature higher than the ambient temperature of the fluid in the fluid flow 14, the temperature distribution may be asymmetrical and the amount of asymmetry may be related to the flow rate of the fluid flow 14 in the sensor channel 26 and, in some cases, the fluid channel 12. The flow rate of the fluid flow 14 may cause the upstream sensor element 20 to sense a relatively cooler temperature than the downstream sensor element 24. In other words, the flow rate of the fluid flow 14 may cause a temperature differential between the upstream sensor element 20 and the downstream sensor element 24 that is related to the flow rate of the fluid flow 14 in the sensor channel 26 and/or fluid channel 12. The temperature differential between the upstream sensor element 20 and the downstream sensor element 24 may result in an output voltage differential between the upstream sensor element 20 and the downstream sensor element 24.

In another illustrative embodiment, the mass flow and/or velocity of the fluid flow 14 may be determined by providing a transient elevated temperature condition in the heater element 22, which in turn, causes a transient elevated temperature condition (e.g. heat pulse) in the fluid flow 14. When there is a non-zero flow rate in the fluid flow 14, the upstream sensor element 20 may receive a transient response later than the downstream sensor element 24. The flow rate of the fluid flow 14 can then be computed using the time lag between the upstream sensor element 20 and downstream sensor element 24, or between the time the heater is energized and when the corresponding elevated temperature condition (e.g. heat pulse) is sensed by one of the sensors, such as the downstream sensor 24.

Further, it is to be understood that the illustrative heater element 22 and sensing elements 20 and 24 are merely illustrative and, in some embodiments, may not be present, as desired. For example, one or more pressure sensors, acoustical sensors, optical sensors, pitot tubes, and/or any other suitable sensor or sensor combination may be used to sense a measure related to a fluid flow in fluid channel 12, as desired.

In the illustrative embodiments shown in FIGS. 2 and 3, a flow restrictor 16 can situated in the fluid channel 12 to provide a predetermined pressure drop in the fluid flow 14 through the fluid channel 12 (e.g., a pressure drop across opposite ends of, or ports into, the channel 12) at a given flow rate. In some embodiments, the flow restrictor 16 may be integrally formed or molded with the fluid channel 12. For example, the flow restrictor may be formed by a molding process that also forms portions of the flow path that are adjacent to the flow restrictor. In other embodiments, the flow restrictor 16 may be formed and subsequently inserted in and secured to the fluid channel 12.

As shown in FIGS. 2 and 3, the flow restrictor 16 may be an orifice type flow restrictor characterized by a length "L" and an opening 17 having a diameter "$d_2$". In some embodiments, the flow restrictor 16 may have a length to diameter ratio of in the range of about 0.1 to 4.0, but this is not required. Example length to diameter ratios that may be used for the flow restrictor 16 may include, for example, a ratio of 3.5 or smaller, 3.2 or smaller, 2.5 or smaller, 2.0 or smaller, 1.9 or smaller, 1.8 or smaller, 1.7 or smaller, 1.6 or smaller, 1.5 or smaller, 1.4 or smaller, 1.3 or smaller, 1.2 or smaller, 1.1 or smaller, 1.0 or smaller, 0.9 or smaller, 0.8 or smaller, 0.7 or smaller, 0.6 or smaller, 0.5 or smaller, 0.4 or smaller, or any other suitable length to diameter ratio, as desired.

In the illustrative embodiment, the flow restrictor 16 may be configured to precisely control and/or balance the pressure drop and mass flow rate of the fluid flow 14 through the fluid channel 12. For incompressible fluids flowing through an orifice type flow restrictor, such as restrictor 16, the mass flow rate "m" of the fluid flow 14 through the fluid channel 12 can be derived from Bernoulli's equation as the following equation:

$$m = CA\sqrt{2p(P_1 - P_2)}$$

where:

C is the orifice flow correction coefficient that characterizes the geometry of the orifice and the placement of the orifice in the fluid channel and in some cases may vary, for example, from 0.6 to 0.95;

A is the cross-sectional area of the flow restrictor opening 17;

p is the fluid density of the fluid flow 14;

$P_1$ is the fluid pressure upstream of the flow restrictor 16; and $P_2$ is the fluid pressure downstream of the flow restrictor 16.

Further, the cross-sectional area of the opening 17 of the flow restrictor 16 is given by:

$$A = \frac{\pi}{4}d_2^2$$

where:

$d_2$ is the diameter of the opening 17.

Inserting this equation for the cross-sectional area of the flow restrictor into the mass flow equation, we can arrive at a mass flow equation of:

$$m = C\frac{\pi}{4}d_2^2\sqrt{2p(P_1 - P_2)}$$

From this equation, the relationship of the mass flow rate "m" and the pressure change ($P_1 - P_2$) is governed primarily by the square of the flow restrictor opening 17 "$d_2$". By precisely and/or accurately sizing the diameter "$d_2$" of the opening 17, the flow sensors 10 and 18 may precisely control and/or balance the relationship between the mass flow rate m and the change in pressure ($P_1 - P_2$) of the fluid flow 14 through the fluid channel 12. In other words, by precisely and/or accurately designing the diameter "$d_2$" of the opening 17, the flow sensors 10 and 18 may accurately achieve a particular pressure drop at a given mass flow rate m of the fluid flow 14.

FIG. 4 is a cross-sectional view of an illustrative flow sensor assembly 31 that may accurately control and/or balance the relationship between the mass flow rate and the pressure change in the fluid flow. In the illustrative embodiment, the flow sensor assembly 31 may include a flow sensing element 42 mounted on a package substrate 40. The flow sensing element 42 may be configured to sense a measure related to flow rate of a fluid flowing through in flow channel 46. In some embodiments, the flow sensors 10 or 18 shown in FIGS. 2 and 3 may be utilized as the flow sensing element 42, if desired. The package substrate 40 may include a ceramic material, however, other suitable types of material may be used, as desired.

As shown in FIG. 4, the flow sensor assembly 31 includes an outer protective housing including a top protective cover 36 and a bottom protective cover 37. As illustrated, the bottom protective cover 37 may be inserted into a recess of the top protective cover 36. With such a configuration, the top and bottom protective covers 36 and 37 may protect a flow sensing element 42 and any signal conditioning circuitry that may be provided in the housing. In some cases, the bottom protective cover 37 and the top protective cover 36 may be formed from, for example, plastic. However, it is contemplated that any other suitable material may be used, as desired.

As illustrated in FIG. 4, the bottom protective cover 37 of the housing includes a first flow port 35 and a second flow port 33. In some cases, flow port 35 may be an inlet flow port, and flow port 33 may be an outlet flow port, but this is not required. In other cases, flow port 33 may be an inlet flow port and flow port 35 may be an outlet flow port, if desired. In some cases, it is contemplated that the flow sensor assembly 31 may be a bi-directional flow sensor assembly and, in this case, either flow port 33 or flow port 35 may serve as the inlet flow port or the outlet flow port, depending on the current direction of the fluid flow through a flow channel 46.

The bottom protective cover 37 and the top protective cover 36 may define a cavity for receiving package substrate 40 with the flow sensing element 42 mounted thereon. In the illustrative embodiment, a surface of the package substrate 40, which includes the flow sensing element 42, and an inner surface of the bottom housing cover 37 may define flow channel 46 of the flow sensor assembly 31. The flow channel 46 may extend from flow port 35 of the bottom protective cover 37, along the flow sensing element 42, and to flow port 33 of the bottom protective cover 37. The flow channel 46 may expose the flow sensing element 42 to a fluid flow. In some embodiments, as shown in FIG. 4, the flow channel 46 may include two or more bends of about 90 degrees. For example, a first bend of about 90 degrees may be provided in the flow channel 46 between flow port 35 and flow sensor 42, and a second bend of about 90 degrees may be provided in the flow channel 46 between the flow sensor 42 and flow port 33. While bends of about 90 degrees are shown, it is contemplated that the fluid channel 46 may be configured to include bends any other angles, such as, for example, 45 degrees, or no bends at all.

In some embodiments (not shown), flow sensor assembly 31 may include one or more electrical leads electrically connected to the flow sensing element and extending external of the outer protective housing. For example, the one or more electrical leads may be configured to receive a signal transmitted from the flow sensing element corresponding to the sensed flow rate of a fluid flowing through flow channel, via one or more traces provided on the package substrate. In some cases, the one or more electrical leads may include a metal, however, any suitable conductive material may be used, as desired.

In some embodiments, the outer protective housing may also include one or more mounting holes 38. As illustrated, top protective housing 36 includes two mounting holes 38, but any suitable number of mounting holes may be used, as desired. The mounting holes 38 may be configured to receive a fastener, such as a screw, bolt, or nail, to mount the top protective cover 36 to a desired surface to accommodate the particular equipment for which the flow sensor assembly 31 may be used. It is contemplated that top protective cover 36 or the bottom protective cover 37 may include additional mounting holes 38 or no mounting holes 38, as desired.

In the illustrative embodiment, the flow sensor assembly 31 may include a flow restrictor 39 situated in the fluid channel 46 to provide a predetermined pressure drop in fluid flowing through the fluid channel 46 at a given flow rate. The flow restrictor 39 may include an opening 41 having a diameter that is reduced relative to adjacent portions of the fluid channel 46, and the flow restrictor may be designed (e.g., may have a precisely controlled diameter) to provide a specified pressure drop at a given flow level.

As illustrated in FIG. 4, the flow restrictor 39 is situated in and integrally molded with flow port 33. However, in other instances, flow restrictor 39 may be positioned in flow port 35 or two flow restrictors may be provided, one in each of flow ports 33 and 35, if desired. In some embodiments, positioning the flow restrictor 39 only in the outlet flow port, which in some embodiments may be flow port 33, may help to decrease noise sensed by the flow sensor 42. For example, the flow restrictor 39 may create turbulence in the fluid flow and, when positioned upstream of the flow sensor 42, may create noise in the flow sensor 42. In this instance, positioning the flow restrictor 39 downstream of the flow sensor 42 may provide a relatively more laminar fluid flow across the flow sensor 42 creating less noise in the flow sensor 42.

In the illustrative embodiment, the flow restrictor 39 may be designed, formed, and/or molded to accurately control the pressure drop through fluid channel 46 at a given flow rate. In particular, the flow restrictor 39 may be formed (e.g., molded) in a manner that minimizes defects or irregularities that would impact flow of a fluid through the flow restrictor (e.g., defects or irregularities that would affect a pressure drop across the flow restrictor (i.e., by affecting the diameter of the orifice in the flow restrictor)). More specifically, and in the example context of a telescoping molding process through which the flow restrictor is formed in some embodiments, the molding process can be controlled in a manner that controls the shape and position of any flash.

As used herein, flash can refer to excess material that is formed during a molding process, typically at the interface of mating pieces of a mold. For example, in a telescoping mold comprising two or more portions (e.g., die) that mate to form a cavity having the desired shape of a finished piece—into which cavity material (e.g., thermoplastic or other suitable material) is injected—excess material can work its way between the mating pieces, at the mating interface, to form flash. In a perfectly dimensioned mold, where the two or more portions mate without any space between, and in a perfectly controlled molding process, where just the right amount of material is injected, at just the right pressure, flash might be theoretically eliminated. However, most molds have, or develop over time, some spaces at the mating interface that facilitate the formation of flash.

Given the likely existence of flash in a molded part such as the flow restrictor described herein, a mold that is employed to form the flow restrictor can be configured in such a way that any resulting flash is oriented in a direction that does not impact critical fluid properties of the flow restrictor. In particular, the mold can be configured such that flash (47 shown in FIG. 5) is not deposited in the opening 41 of the flow restrictor 39 and does not reduce the diameter of opening 41. Instead, as discussed in more detail with regards to FIG. 5, the flash 47 may be oriented to extend in a direction generally parallel to an axis of the flow restrictor 39 and not in an orientation generally perpendicular to the flow restrictor 39, as in the flow sensor shown in FIG. 1.

Figure 5:
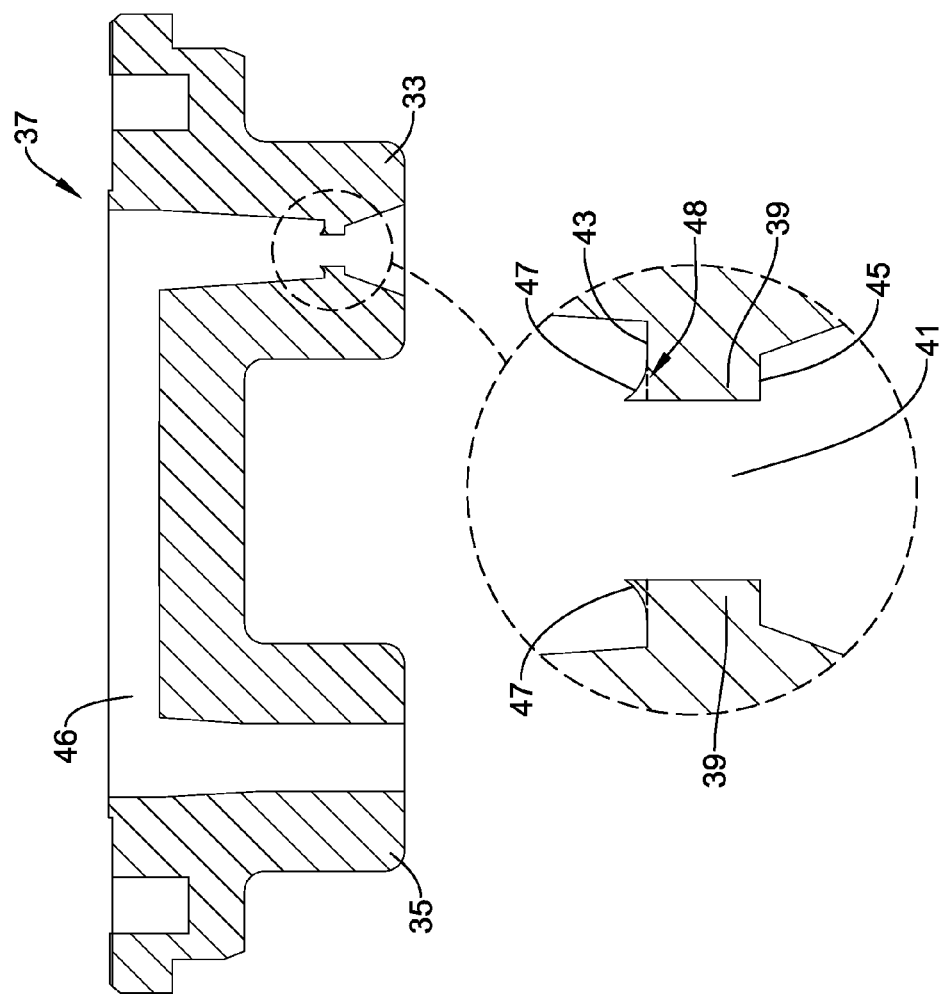
FIG. 5 is a cross-sectional view of a bottom protective cover of the flow sensor assembly of FIG. 4.

As shown in FIG. 5, which is a cross-section view of the bottom protective cover 37 of the flow sensor assembly shown in FIG. 4, flash 47, which may result from the molding process of the bottom protective cover 37, may be formed on an upper surface 43 of the flow restrictor 39. The flash 47 may also be oriented to extend in a generally upwards direction, or a direction that is parallel to and away from the flow restrictor 39. In some embodiments, the flow restrictor 39 may be designed to have the upper surface configuration shown by dashed line 48. However, as a result of the molding process, flash 47, if present, may be formed on the upper surface 43 of the flow restrictor 39 and may have a diameter equal to or greater than the diameter of opening 41 of the flow restrictor 39, and a central axis that is in line with an axis of the flow restrictor itself and in line with an axis of flow of a fluid through the flow restrictor. In other words, the mold may be configured such that any flash 47 that results is oriented to not reduce the diameter of the opening 41 of the flow restrictor 39. While flash 47 is shown on upper surface 43 of the flow restrictor 39, it is contemplated that flash 47 may be formed on a lower surface 45 of the flow restrictor 39, depending on the specifics of the mold and molding process.

In the illustrative embodiment, the flash 47 may not significantly impact the pressure drop of the fluid flowing through flow channel 46 at a given flow rate. In this embodiment, the flow sensor assembly 31 may be configured to accurately and precisely control and/or balance the pressure drop and the mass flow rate of a fluid flowing through the flow channel 46 at a given flow rate.

Figure 6:
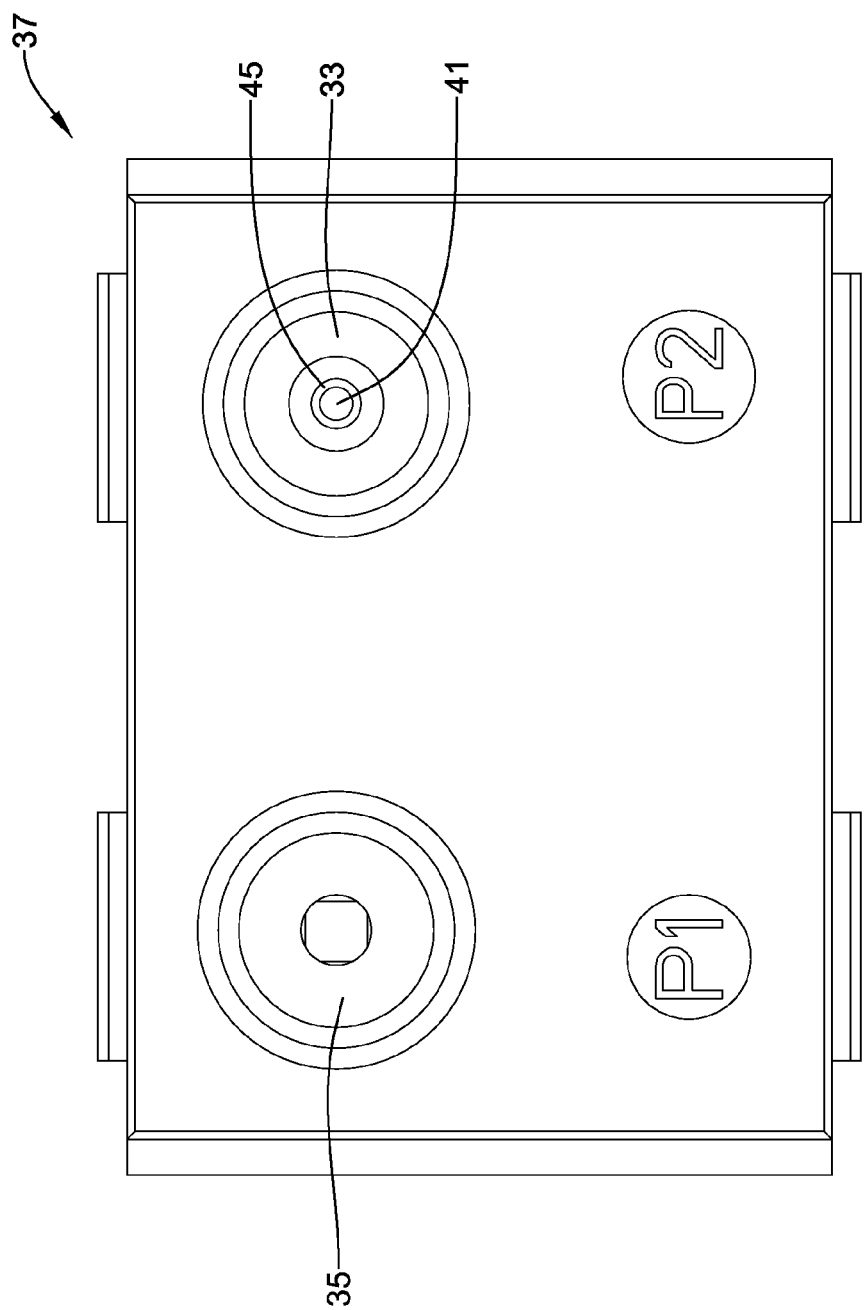
FIG. 6 is a bottom view of the bottom protective cover shown in FIG. 5.

FIG. 6 is a bottom view of the bottom protective cover 37 shown in FIG. 5. With flow restrictor 39 integrally formed with flow port 33, flow port 33 may have a diameter that is less than a diameter of flow port 35. In some embodiments, flow port 33 may be configured as an output flow port, but this is not required. In other embodiments, flow port 33 may be configured as an input flow port and flow port 35 may be configured as an output flow port, if desired.

As shown in FIG. 6, flow port 33 and flow restrictor 39 may be completely formed from the bottom protective cover 37. In other words, the flow restrictor 39 may be defined by the bottom protective cover 37 on the front side, back side, left side, and right side. However, it is contemplated that in other embodiments, the flow restrictor 39 may be only partially defined by the bottom protective cover 37, if desired.

In some embodiments, the opening 41 of the flow restrictor 39 may be generally circular in shape, as shown in FIG. 6. However, it is contemplated that opening 41 of the flow restrictor 39 may have a rectangular shape, an oval shape, or any other suitable shape, as desired. As shown in FIG. 6, the opening 41 of flow restrictor 39 in flow port 33 may be a different shape than the opening in flow port 35. For example, flow port 35 may have a generally square-shaped opening and opening 41 may be generally circular. However, it is contemplated that openings in flow ports 35 and 33 may be the same shape or different shapes, as desired.

Figure 7:
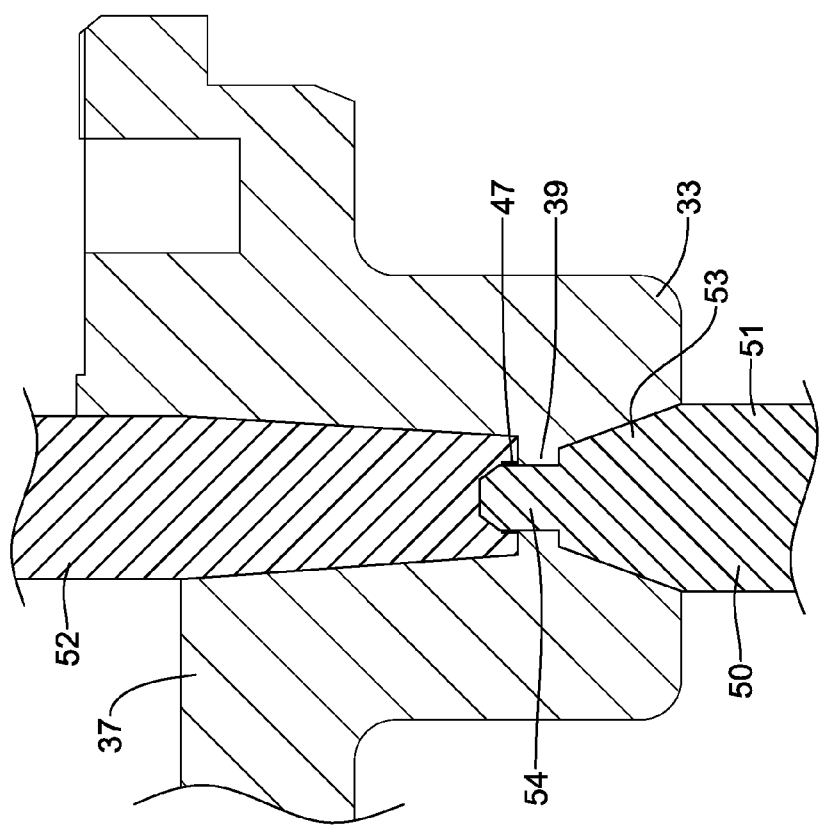
FIGS. 7 and 8 are cross-sectional views of an illustrative mold for molding a flow restrictor in a flow port of the bottom protective cover of FIG. 5.
Figure 8:
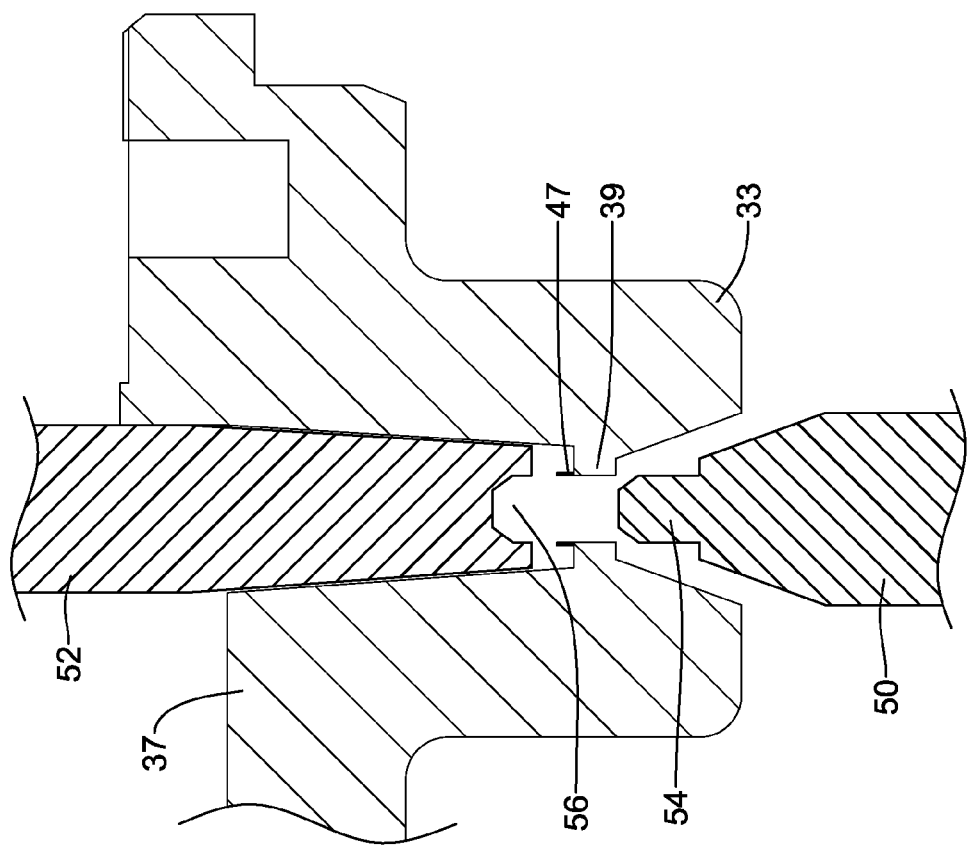

FIGS. 7 and 8 are cross-sectional views of flow port 33 of the bottom protective cover 37 and a mold for forming the flow port 33. As shown in FIG. 7, the mold may include a first mold piece 52 and a second mold piece 50. For simplicity, only the portion of the mold pieces 50 and 52 forming the flow port 33 and flow restrictor 39 are shown. However, it is to be understood that the mold pieces 50 and 52 may be configured to form other portions of the bottom protective cover 37, as desired.

As shown in FIG. 7, mold piece 50 and mold piece 52 are mated together to form the flow port 33 and the flow restrictor 39. In some embodiments, mold piece 50 may include one or more regions having different diameters. As shown, mold piece 50 may include a first portion 51, a second portion 54, and a third portion 53 having different and/or varying diameters. The first portion 51 may have a first constant diameter. The second portion 54 may have a second constant diameter that is smaller than the first portion 51 and designed to provide a desired diameter to opening 41 of the flow restrictor 39. The third portion 53 may have a diameter that tapers from the first constant diameter of the first portion 51 to a diameter smaller than the first portion 5, but larger than the second constant diameter. Mold piece 52 may include a constant diameter portion and a tapering portion to form a portion of the flow port 33 above the flow restrictor 39.

As illustrated in FIG. 8, mold piece 52 may include an opening 56 configured to receive and/or mate with portion 54 of mold piece 50. Because of how portion 54 of mold piece 50 mates with mold piece 52 during the molding process, any flash 47 that is formed (e.g., because excess material is squeezed between the mold pieces 50 and 52) may be disposed along an axis of the resulting flow restrictor, rather than across the diameter of the opening 41 of the flow restrictor 39, as might result from other mold configurations or designs (e.g., the configuration illustrated in FIG. 1). As shown in the example of FIG. 8, the flash 47, if present, may be formed on the upper surface 43 of the flow restrictor 39, have a diameter equal to or greater than the diameter of the flow restrictor 39, and/or extend in a direction generally parallel to and away from flow restrictor 39. In the illustrative embodiment, mold pieces 50 and 52 may be configured to precisely and accurately size the diameter of opening 41 to a designed diameter opening to provide a specified pressure drop through the flow channel 46 at a given flow rate.

While the mold has been described with mold piece 54 having opening 56 to receive at least part of portion 54 of mold piece 50, it is contemplated that mold piece 50 may include an opening to receive part of mold piece 52, if desired. In this embodiment, the flash 47 may be formed on a lower surface (45 shown in FIG. 5) of the flow restrictor 39.

Figure 9:
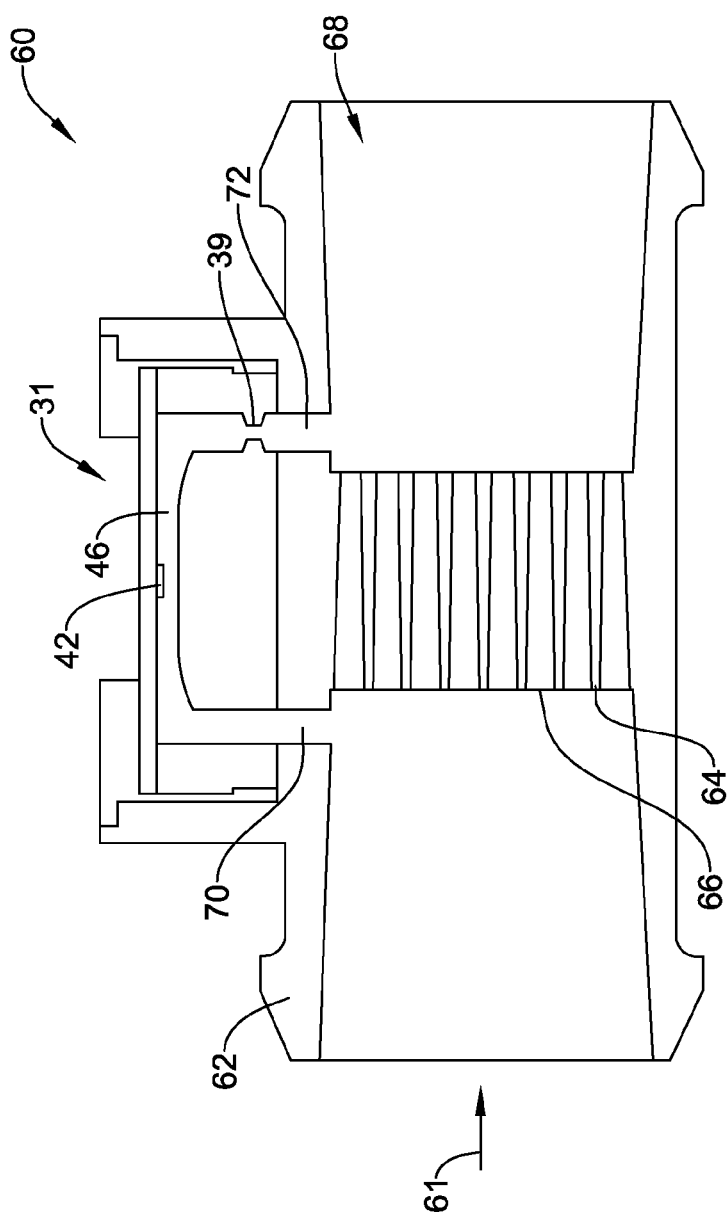
FIGS. 9 and 10 are cross-sectional views of an illustrative for sensing system including the flow sensor assembly of FIG. 4.
Figure 10:
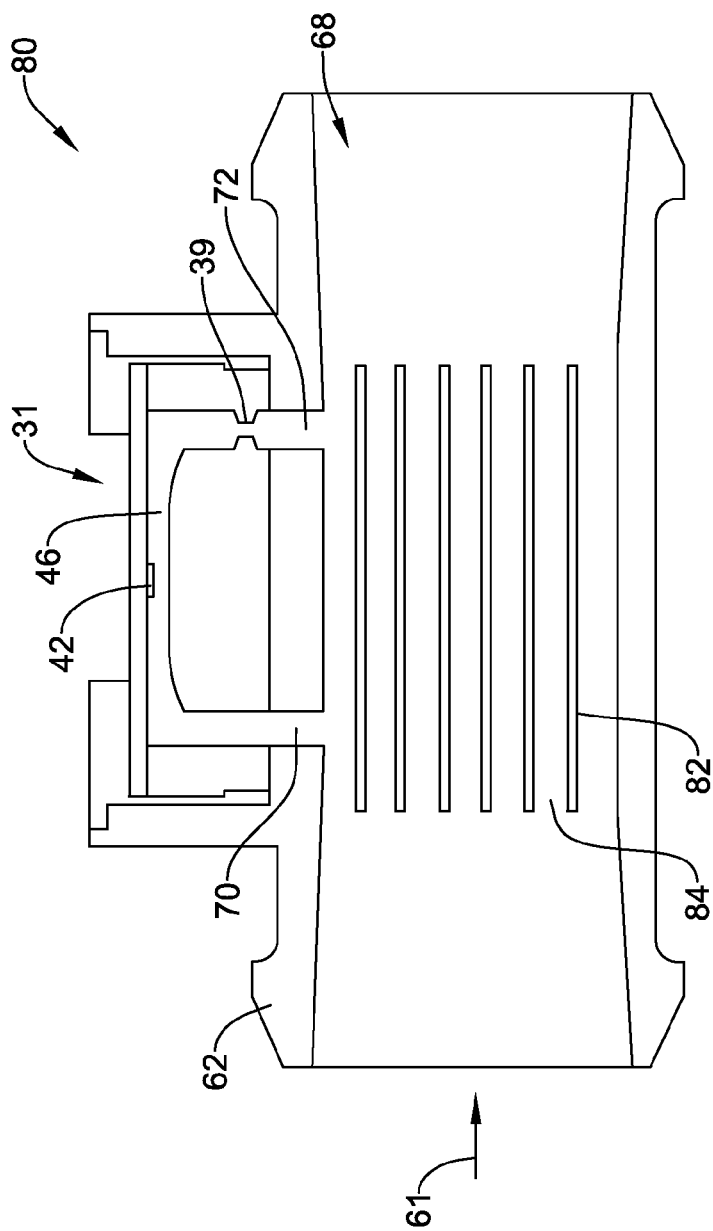

FIGS. 9 and 10 are cross-sectional views of flow systems 60 and 80 for measuring the rate of a fluid flow. As shown, flow sensor assembly 31 of FIG. 4 may be used in conjunction with the flow systems 60 and 80, if desired. In some embodiments, the flow systems 60 and 80 may be used in high-volume flow systems, mid-volume flow systems, or low-volume flow systems. Example fluid flow applications can include, but are not limited to, medical applications (e.g. respirometers, ventilators, spirometer, oxygen concentrators, spectrometry, gas chromatography, sleep apnea machines, nebulizers, anesthesia delivery machines, etc.), flight control applications, industrial applications (e.g. air-to-fuel ratio, spectrometry, fuel cells, gas leak detection, gas meters, HVAC applications), combustion control applications, weather monitoring applications, as well as any other suitable fluid flow applications, as desired.

As shown in FIGS. 9 and 10, flow systems 60 and 80 may include a housing 62 defining a main system flow channel 68 for receiving a fluid flow. Flow sensor assembly 31 may be disposed in fluid channel 46, which may be referred to as a bypass channel, parallel to the main system flow channel 68. The flow sensor assembly 31 may include a flow sensor 42, such as, for example, a thermal flow sensor as shown in FIG. 3. In operation, fluid may flow through the main flow channel 68, a portion of the fluid flows through the bypass channel 46 so that the flow sensor 42 can measure the flow rate of the fluid in the flow channel 68 (e.g., indirectly). Bypass channel 46 may be fluidly connected to the main flow channel 68 via taps 70 and 72, which may couple with flow ports 35 and 33 (shown in FIG. 4). In some embodiments, the flow rate of the fluid in the bypass sensing channel 46 may be a fraction of the flow rate of the fluid in the flow channel 68.

In some embodiments, the flow systems 60 and 80 may include a flow restrictor or laminar flow element (LFE), such as LFE 66 and LFE 82, situated in the main flow channel 68. The LFEs 66 and 82 may be configured to laminarize the fluid flow and/or create a pressure drop across the pressure inlet 70 and outlet 72 of the bypass sensing channel, which facilitates fluid flow into the bypass channel 44. The pressure drop across LFEs 66 and 82 may be dependent on restrictor geometry and placement of pressure taps 70 and 72 and may increase with flow rate. Furthermore, the fluid in the main flow channel 68 may become increasingly turbulent as the flow rate of the fluid increases. The LFEs 66 and 82 may be configured to straighten or laminarize the flow in the main flow channel 68 to reduce turbulence in the fluid flow by forcing the fluid to flow through a series of spaced orifices 64 and 84. In some embodiments, the orifices 64 and 84 can be circular and concentrically spaced about an axis of the main flow channel 68. However, other geometries of orifices adapted to arbitrary cross-sectional shapes of the main flow channel 68 and extending substantially parallel to the axis of the main flow channel 68 may be employed. In some embodiments, the orifices 64 and 84 may have a uniform repeating pattern of orifices of substantially identical hydraulic diameter throughout or a partially-repeating pattern in which orifices 64 and 84 are symmetrically aligned about the axis with other orifices of substantially the same hydraulic diameter. However, it is contemplated that other flow restrictors or LFEs may be used, as desired.

In some embodiments, as shown in FIG. 9, the LFE 66 may be integrally formed or molded with the housing 62 of the main flow channel 68. While in other embodiments, as shown in FIG. 10, the LFE 82 may be formed separately and inserted into main flow channel 68. For example, LFE 82 may be a honeycomb flow restrictor, but this is not required. Some illustrative flow system configurations and flow restrictors (i.e. LFEs) that are considered suitable to be used with the flow sensor assembly 31 of FIG. 4 are disclosed in, for example, U.S. Pat. No. 6,655,207. It is contemplated that flow systems 60 and 80 may include any of the features disclosed therein.

Laminarizing a fluid flow through the main flow channel 68 can be accomplished by adjusting the geometry of the orifices 64 and 68 to reduce a Reynolds number (Re), which is an index relating to turbulence. The Reynolds number is given by:

$$Re = \rho * V * d / \mu$$

where:
ρ is a fluid density;
V is a mean velocity of flow;

d is a characteristic distance (diameter or hydraulic radius); and

μ is a viscosity.

As shown from this equation, the mean velocity of the flow and the diameter of hydraulic radius are governed by the geometry of the LFE 64 and 82 and influence the Reynolds number and turbulence.

The LFEs 64 and 82 can be configured to create a pressure differential to drive the fluid flow through flow sensor assembly 31. The pressure created by LFE 64 or 82 can be designed to precisely balance a pressure drop between taps 70 and 72. Imbalances between a mass flow pressure drop relationship of the LFE 66 or 82 and a mass flow pressure drop relationship of the sensor assembly 31 may cause variations in a sensor signal from flow sensor 42, which for some applications may be unacceptable. Wide variations in the sensor signal may cause signal extremes such as, for example, saturation due to excessive flow through the flow sensor assembly 31 or low signal having insufficient resolution due to insufficient flow through the flow sensor assembly 31. In either case, flow sensor 42 may imprecisely measure the flow rate of a fluid flowing through flow system 60 or 80. By precisely controlling the geometry of the flow restrictor 39, as discussed above and in some embodiments, a precise mass flow rate may be achieved at any given pressure differential created by LFE 66 or 82 leading to precise control of the flow sensor 42.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow sensor housing, comprising:
   a housing body including an inlet flow port and an outlet flow port, the housing body defining a fluid channel extending between the inlet flow port and the outlet flow port;
   a first region of the fluid channel defined by side walls, the first region positioned in and integrally molded with the housing body, wherein the side walls of the first region define a first cross-sectional area;
   a second region of the fluid channel defined by side walls, the second region positioned in and integrally molded with the housing body, the second region disposed immediately upstream or downstream of the first region, wherein the side walls of the second region are laterally spaced outward from the side walls of the first region and define a second cross-sectional area that is greater than the first cross-sectional area, and wherein an interconnecting surface extends between the side walls of the first region and the side walls of the second region; and
   flash integrally molded with the housing body and extending the side walls of the first region into the second region, wherein the flash, the interconnecting surface and the side walls of the second region collectively define a volume that is open to and with a space between the flash and the side walls of the second region, the space being in fluid communication with the fluid channel.

2. The flow sensor assembly of claim 1, further comprising:
   a flow sensor exposed to the fluid channel, the flow sensor configured to sense a measure related to a flow rate of a fluid flowing through the fluid channel.

3. The flow sensor assembly of claim 2, wherein the second region is disposed immediately upstream of the first region and the first region is positioned downstream of the flow sensor.

4. The flow sensor assembly of claim 2, wherein the second region is disposed immediately downstream of the first region and the first region is positioned upstream of the flow sensor.

5. The flow sensor assembly of claim 2, wherein the first region is positioned downstream of the flow sensor and, wherein during operation of the flow sensor assembly, a fluid passes through the inlet flow port, across the flow sensor, through the first region, past the flash and into the second region, and through the outlet flow port.

6. The flow sensor assembly of claim 2, wherein the first region is positioned upstream of the flow sensor and, wherein during operation of the flow sensor assembly, a fluid passes through the inlet flow port, through the first region, past the flash and into the second region, across the flow sensor, and through the outlet flow port.

7. The flow sensor assembly of claim 2, wherein the fluid channel includes two or more bends of about 90 degrees, wherein a first bend is between the inlet flow port and the flow sensor and a second bend is between the flow sensor and the outlet flow port.

8. The flow sensor assembly of claim 1, wherein the flash has a generally annular shape and extends in an upstream direction or a downstream direction from the first region.

9. A flow sensor assembly, comprising:
   a housing body including an inlet flow port and an outlet flow port, the housing body defining a fluid channel extending between the inlet flow port and the outlet flow port;
   a flow sensor exposed to the fluid channel, the flow sensor configured to sense a measure related to a flow rate of a fluid flowing through the fluid channel; and
   a flow restrictor positioned in the fluid channel and monolithically formed with the housing body, the flow restrictor configured to provide a predetermined pressure drop through the flow channel at a given flow rate, wherein the flow restrictor includes a restricted cross-section portion immediately adjacent a less-restricted cross-section portion, wherein cross-sections of the restricted cross-section portion and the less-restricted cross-section portion are generally concentric, and wherein traversing between the restricted cross-section portion and the less-restricted cross-section portion entails an abrupt change in fluid channel cross-sectional area; and
   flash monolithically formed with the flow restrictor in the fluid channel, wherein the flash is positioned in the fluid channel such that the flash does not reduce the cross-sectional area of the restricted cross-section portion of the flow restrictor and is positioned on an upstream side of the flow restrictor.

10. The flow sensor assembly of claim 9, wherein the flow restrictor is positioned downstream of the flow sensor in the fluid channel and, when during operation of the flow sensor assembly, a fluid passes through the inlet flow port, across the flow sensor, through the flow restrictor, and through the outlet flow port.

11. The flow sensor assembly of claim 9, wherein the flow restrictor is positioned upstream of the flow sensor in the fluid channel and, when during operation of the flow sensor assembly, a fluid passes through the inlet flow port, through the flow restrictor, across the flow sensor, and through the outlet flow port.

12. The flow sensor assembly of claim 9, wherein the fluid channel includes two or more bends of about 90 degrees, wherein a first bend is between the inlet flow port and the flow sensor and a second bend is between the flow sensor and the outlet flow port.

13. A flow sensor assembly, comprising:
a first housing member;
a second housing member, the second housing member including a first flow port and a second flow port, wherein the first housing member and the second housing member define a fluid channel extending between the first flow port and the second flow port;
a flow sensor positioned between the first housing member and the second housing member adjacent to the fluid channel, the flow sensor configured to sense a measure related to a flow rate of a fluid flowing through the fluid channel;
a flow restrictor integrally molded with the first flow port and configured to provide a predetermined pressure drop through the fluid channel at a given flow rate, wherein the flow restrictor is completely defined by the second housing member to include an opening having a diameter, wherein the flow restrictor includes a length and has a length to diameter ratio of about 4.0 or smaller; and
wherein the fluid channel includes two or more bends of about 90 degrees, wherein a first bend is between the first flow port and the flow sensor and a second bend is between the flow sensor and the second flow port.

14. The flow sensor assembly of claim 13, wherein the first flow port is an inlet flow port and, wherein during operation of the flow sensor assembly, a fluid passes through the first flow port, through the flow restrictor, across the flow sensor, and through the second flow port.

15. The flow sensor assembly of claim 13, wherein the first flow port is an outlet flow port and, wherein during operation of the flow sensor assembly, a fluid passes through the second flow port, across the flow sensor, through the flow restrictor, and through the first flow port.

16. The flow sensor assembly of claim 13, wherein the ratio of the length to diameter of the flow restrictor is about 2.0 or smaller.

17. The flow sensor assembly of claim 13, further comprising flash monolithically formed with the flow restrictor in the fluid channel, wherein the flash is oriented to define a cross-sectional area of the fluid channel equal to or greater than a cross-sectional area of the fluid channel defined by the opening of the flow restrictor.

18. The flow sensor assembly of claim 14, wherein the flash is configured to extend from the flow restrictor in a direction parallel with fluid flow in the fluid channel at the flow restrictor.

* * * * *